(12) United States Patent
Dür

(10) Patent No.: US 10,315,145 B2
(45) Date of Patent: Jun. 11, 2019

(54) FILTER FOR FILTERING A LIQUID OR A GAS

(71) Applicant: SEFAR AG, Heiden (CH)

(72) Inventor: Hansjörg Dür, Schwarzach (AT)

(73) Assignee: Sefar AG, Heiden (CH)

( * ) Notice: Subject to any disclaimer, the term of this patent is extended or adjusted under 35 U.S.C. 154(b) by 173 days.

(21) Appl. No.: 15/535,209

(22) PCT Filed: Oct. 29, 2015

(86) PCT No.: PCT/EP2015/075093
§ 371 (c)(1),
(2) Date: Aug. 1, 2017

(87) PCT Pub. No.: WO2016/119926
PCT Pub. Date: Aug. 4, 2016

(65) Prior Publication Data
US 2017/0354909 A1   Dec. 14, 2017

(30) Foreign Application Priority Data
Jan. 26, 2015   (EP) ..................................... 15152464

(51) Int. Cl.
*B01D 46/00* (2006.01)
*B01D 46/02* (2006.01)
(Continued)

(52) U.S. Cl.
CPC ......... *B01D 46/0005* (2013.01); *B01D 29/13* (2013.01); *B01D 35/02* (2013.01); *B01D 35/306* (2013.01); *B01D 39/08* (2013.01); *B01D 46/0012* (2013.01); *B01D 46/02* (2013.01); *B01D 46/023* (2013.01); *B01D 69/04* (2013.01); *B01D 2201/02* (2013.01);
(Continued)

(58) Field of Classification Search
CPC ........ B01D 2201/02; B01D 2201/0423; B01D 2265/06; B01D 2313/06; B01D 29/13; B01D 35/02; B01D 35/306; B01D 39/08; B01D 46/0005; B01D 46/0012; B01D 46/02; B01D 46/023; B01D 69/04
See application file for complete search history.

(56) References Cited

FOREIGN PATENT DOCUMENTS

| DE | 85 26 820 U1 | 1/1989 |
|---|---|---|
| DE | 100 52 166 A1 | 6/2001 |

(Continued)

OTHER PUBLICATIONS

International Search Report issued in PCT/EP2015/075093, dated Jan. 29, 2016.
(Continued)

*Primary Examiner* — John Kim
(74) *Attorney, Agent, or Firm* — Studebaker & Brackett PC

(57) ABSTRACT

The invention relates to a filter for filtering a liquid or a gas, with a pocket-shaped filter element which has a sleeve-shaped circumferential region, a closed head region and an open foot region, and with a frame element which has an annular base, in which the foot region of the filter element is accommodated, and at least one supporting strut which extends away from the base along the circumferential region of the filter element. An advantageous design of the filter is achieved by forming the head region of the filter element with a saddle shape, wherein two lateral tips are provided between which a channel-shaped recess is formed.

12 Claims, 3 Drawing Sheets

(51) Int. Cl.
*B01D 35/02* (2006.01)
*B01D 39/08* (2006.01)
*B01D 69/04* (2006.01)
*B01D 35/30* (2006.01)
*B01D 29/13* (2006.01)

(52) U.S. Cl.
CPC .. *B01D 2201/0423* (2013.01); *B01D 2265/06* (2013.01); *B01D 2313/06* (2013.01)

(56) References Cited

FOREIGN PATENT DOCUMENTS

| | | |
|---|---|---|
| DE | 20 2008 012 284 U1 | 12/2008 |
| DE | 20 2011 109 523 U1 | 3/2013 |
| EP | 1 088 720 A2 | 4/2001 |
| EP | 1 419 720 A1 | 5/2004 |
| EP | 2 329 872 A2 | 6/2011 |
| EP | 2 165 749 B1 | 11/2011 |
| GB | 1 521 710 A | 8/1978 |

OTHER PUBLICATIONS

Translation of the International Preliminary Report on Patentability; PCT/EP2015/075093, dated May 29, 2017.

FILTER FOR FILTERING A LIQUID OR A GAS

The invention relates to a filter for filtering a liquid or a gas with a pocket-shaped filter element which has a sleeve-shaped circumferential region, a closed head region and an open foot region, and with a frame element which has an annular base, in which the foot region of the filter element is accommodated, and at least one supporting strut, which extends away from the base along the circumferential region of the filter element, according to the generic term of claim 1.

Such sleeve-shaped or candle-like filters are used in wide-ranging applications, in particular in fluid lines, for instance to retain solid particles. It is desired with respect to such filters that on the one hand they are very compact so that they can be arranged in smaller lines as well. On the other hand, these filters should comprise a large effective filter area, so that sufficient fluid throughput is given while the flow resistance is as low as possible.

EP 1 088 720 A2 discloses a filter for a vehicle window cleaning unit with a base and a cylindrical filter element, which is secured to the base through supporting struts. In the head region of the filter element averted from the strut a disc-shaped insert component is provided, which is connected to the supporting struts through an annular retaining section.

DE 20 2011 109 523 U1 discloses a filter for insertion into a filler neck of a container. Said filter also comprises a frame element with a base and supporting struts extending in the longitudinal direction holding a sleeve-shaped filter element. A filter sieve is arranged at the outlet end turned away from the base, which is inclined towards the flow direction.

The design of the filter element consisting of several parts is principally labour- and cost-intensive. In addition, there is a problem of possible leaks.

EP 2 165 749 B1 discloses a filter with a frame element and a filter element. The filter element is designed as a simple continuous strip extending at the candle-shaped filter alongside two relatively broad lateral supporting struts. Contrary to a pocket- or pouch-shaped filter element, this known filter provides a limited filter area because of the relatively broad lateral supporting struts.

Such a filter with a frame element with two supporting struts and an annular base, which can also be referred to as pipe socket, is also known from the disclosure DE 20 2008 012 284 U1.

A filter bag that can be hooked up in a coffee cup, also known as drip-bag, is known from the EP 1 419 720 A1. Said filter bag comprises foldable hooks on its opposite side surfaces.

A generic filter is known from DE 100 52 166 A1. The filter element is thereby pocket-shaped and provided with a sleeve-shaped circumferential area, the head region of which is closed, and the foot region of which is open. The foot region is enclosed by an annular base or pipe socket in order to be installed in an oil pipeline. The sleeve-shaped filter element and the pipe socket-like base form a candle-shaped filter. The filter element is thereby assembled in such a manner that the closed head region either is designed convex, dome-like or is folded inwardly. If folded inwardly, the lateral supporting struts protrude into the concave infolding in order to stabilise this filter form. By means of such supporting struts the space in the infolding and the filter areas are significantly restricted.

The invention is based on the object of providing a filter, which provides for a compact design and a big filter area while being easily producible.

According to the invention, this object is solved by a filter comprising the features of claim 1. The preferred embodiments of the invention are specified in the dependent claims.

The filter according to the invention is characterized in that the head region of the filter element is saddle-shaped, whereby two lateral tips are provided between which a channel-shaped recess is formed.

The filter according to the invention comprises a pocket- or pouch-shaped filter element, which is easily producible and also allows for a large filter area. The open foot region of the sleeve-shaped filter element is affixed to the annular base, which is particularly designed to be installed in a fluid pipeline or in a container opening. The annular base with the at least one supporting strut of the frame element ensures a form stabilisation of the sleeve-shaped circumferential area of the filter element. The head region of the filter element facing away from the base is formed with a saddle shape according to the invention. The saddle shape comprises two lateral tips between which a channel-shaped recess is formed. By means of this saddle shape, a relatively large filter surface is created also in the head region of the filter element, whereby at the same time a high dimensional stability is safeguarded. In particular the edge at the transition of the saddle-shaped head region at the sleeve-shaped circumferential region that runs partially concave and partially convex leads to a good stability also in case of alternating flows.

Principally, the pocket-shaped filter element can be formed as single-piece mould body, for instance deep-drawn or built up of several parts. In a particularly advantageous embodiment of the invention, however, the pocket-shaped filter element is formed from one single planar filter material by folding and welding outer edges. In such a manner, the pocket-shaped filter element can be produced simply and cost-effectively. The material piece can efficiently be cut from a planar starting material.

In principle, various folding and welding variants are possible. Two outer edges to be welded can be arranged in such a manner, for instance, that they extend approximately in an L-shape, whereby one outer edge would extend in the head region of the filter element and the other outer edge would extend along the circumferential region of the filter element.

A particularly expedient embodiment example of the invention foresees that two welded outer edges are provided, which extend along a longitudinal axis of the filter element and extend from the foot region to the head region of the pocket-shaped filter element. In such a manner, the welded outer edges are shifted to the less stressed circumferential region of the filter element. The welded outer edges can thereby be covered and additionally stabilized by the axially extending supporting struts.

Another preferred embodiment example of the invention foresees that at least two supporting struts are provided by pairs, which extend alongside opposite sides of the pocket-shaped filter element. The supporting struts are thereby connected to the filter element at least in some areas, so that they stabilize the form of the overall sleeve- or candle-shaped filter element. An arrangement of the two supporting struts on opposite sides that is thus symmetrical allows a symmetrical and thus balanced stress of the filter with the applied flow. Said flow is usually directed in the longitudinal direction with respect to the filter.

A particularly stable design of a filter is reached according to a further embodiment of the invention in that the at least one supporting strut extends along at least one welded outer edge of the filter element from the base to one of the tips in the head region, and in that the welded outer edge is covered by the supporting strut. With that, the supporting struts fulfil a double function. On the one hand, these struts stabilise the sleeve shape of the filter element and on the other hand protect the welded outer edges of the filter element. This also reduces the risk of leakage along the outer edges. Preferably, the tips of the filter element can be accepted and covered by covering caps, which are integrally formed at the top end of the supporting struts.

According to a preferred embodiment of the invention, a further improvement of the strength and stability of the filter is achieved in that the two supporting struts of a pair in the head region are connected with each other by at least one cross member. The cross member is preferably also connected to the filter element in the head region at least in some regions, so that the cross member supports and stabilizes the design in the head region.

According to another embodiment of the invention, it is thereby particularly advantageous that the at least one cross member is adapted to the saddle shape in the head region. Preferably, the cross member can be fixedly connected to the filter material in the head region over its entire length. In case of a folding and welding variant, with respect to which a welded outer edge extends in the head region, said edge is preferably covered by a cross member.

The strength can be improved further according to an embodiment variant of the invention in that two pairs of supporting struts are arranged, which are displaced relative to one another at a 90° angle at the circumference of the base. Preferably, the two pairs can thereby comprise a cross member each, which are arranged crosswise in the head region. A first cross member thereby preferably extends between the two tips in the head region, while the second cross member extends to this at a right angle along the channel axis of the channel-shaped recess. With that, a particularly stable form of the filter element is achieved.

Principally, the supporting struts and cross members can be arranged only along the inner side or the outer side of the filter element. According to an embodiment of the invention, it is preferred that at least one supporting strut and/or at least one cross member are arranged at the inside and the outside of the pocket-shape filter element and connected to it. Preferably, all supporting struts and cross members are provided for along the inside and the outside. However, it is principally also possible to arrange a part of the struts at the outside and a part of the struts at the inside of the filter element.

The filter according to the invention can principally be produced in any way whatsoever. A particularly economical production can be achieved according to an embodiment of the invention in that the frame element is made of a plastic material by way of moulding, in particular injection moulding, whereby the filter element is firmly attached with the frame element during the moulding process. The pocket-shaped filter element is particularly inserted in a mould, so that said element is tightly connected directly with the frame element when the melted plastic material is injected.

Different materials can be used for producing the filter element. It is particularly preferable if the filter element comprises a fabric, a fleece, a knitting and/or a membrane. The filter element can particularly be made of a planar filter material, which is also composed of a combination of the aforementioned materials.

A particularly compact design with a large filter surface according to one embodiment example of the invention is still achieved in that the circumferential region of the filter element is shaped cylindrically or conically.

BRIEF DESCRIPTION OF THE DRAWINGS

The invention is described hereunder with reference to preferred embodiment examples that are schematically illustrated in the attached drawings. The illustrations show the following.

Figure 1:
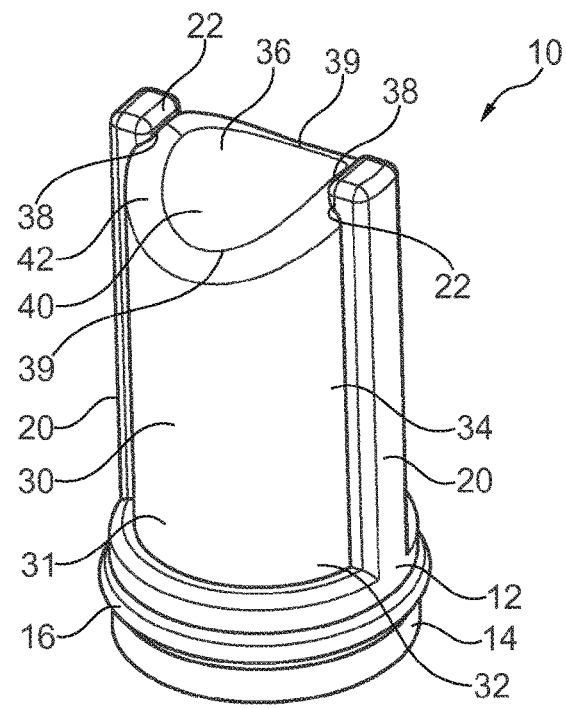
FIG. 1: a perspective view of a first filter according to the invention with two supporting struts.
Figure 2:
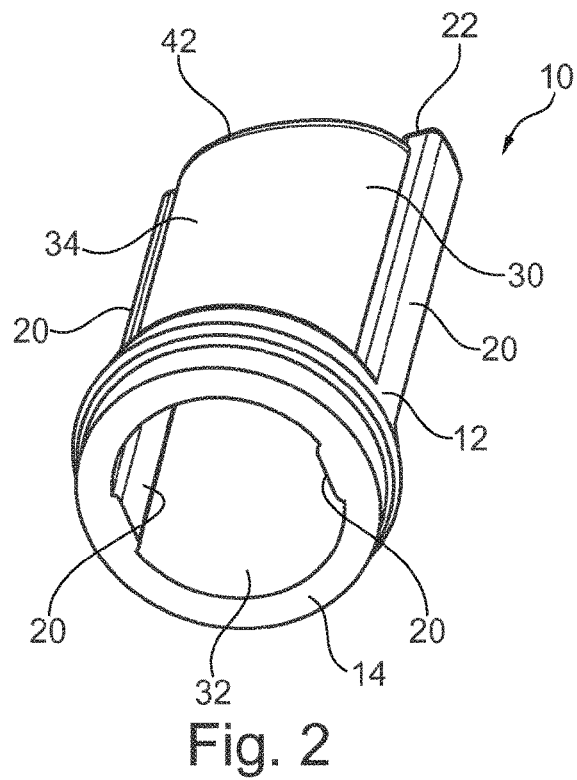
FIG. 2: a perspective bottom view of the first filter according to the invention shown in FIG. 1.

According to a first embodiment example according to FIGS. 1 and 2, a filter 10 according to the invention is shaped candle-like with a pipe socket-like base 14. The annular base 14 is provided with a sealing ring 16 at its outer surface, so that the filter 10 with the base 14 can be installed in a line. Two supporting struts 20 lying at the base 14 opposite one another are arranged, which are extending essentially parallel to the longitudinal axis of the filter 10. The supporting struts 20 and the base 14 jointly form a frame element 12, in which a cup-shaped or pocket-shaped filter element 30 is accommodated and held. As apparent from FIG. 2, the supporting strut 20 is arranged along the inside and the outside of the filter element 30. In such a manner, the welded outer edges of the filter element 30 can be surrounded or enclosed by a supporting strut 20 on both sides. A fluid may flow through the base 14 in an internal cavity of the filter 10 and then through the filter element 30. Alternatively, the flow can also take place from the outside to the inside.

The filter element 30 is made of a thin filter material 31, in particular a filter fabric. The filter element 30 comprises a sleeve-shaped circumferential region 34. A foot region 32 of the filter element 30 is open and accommodated in the annular base 14. The filter element 30 is closed in the head region 36 provided opposite the base 14. The filter element 30 with the circumferential region 34 and the head region 36 is formed by a single piece of filter material 31 by way of folding and welding two outer edges extending in the longitudinal direction. In the illustration according to FIG. 1, the welded outer edges are covered by the beam-like supporting struts 20.

The head region 36 of the filter element 30 according to the invention has a saddle shape with a curved edge 42. Along the curved edge 42, two lateral tips 38 are provided in two opposite convex segments. In an adjacent concave region of the edge 42, two low points 39 are arranged. A channel-shaped recess 40 extends between the two equally high tips 38 transversely to a longitudinal axis of the filter 10 and also transversely to the connecting line between the two tips 38. The base of the channel-shaped recess 40 passes through the two low points 39, which are arranged at the same level.

The saddle-shaped head region 36 has a relatively large filter surface due to the special design while ensuring a high dimensional stability. Due to the high dimensional stability, with respect to the shown embodiment it suffices that the thin-walled filter element 30 is exclusively held by an essentially linear connection with the supporting struts 20 located at the inside and the outside. The supporting struts 20 have at their respective upper free end a covering cap 22 towering radially inwardly, in which one tip 38 is respectively accommodated and held at least partially.

The filter element 30 can be glued into the frame element 12 or preferably be connected to the frame element directly during the injection moulding process.

Figure 3:
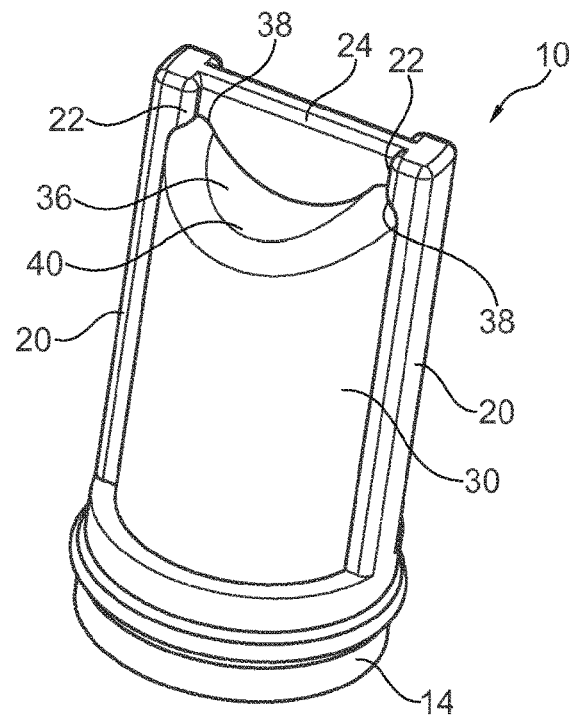
FIG. 3: a perspective view of a second filter according to the invention with one cross member.

Another embodiment of a filter 10 according to the invention is shown in FIG. 3, whereby the filter 10 is essentially formed like the filter 10 in FIG. 1. Other than the filter 10 shown in FIG. 1, the second embodiment according to FIG. 2 shows an additional cross member 24 in the head region 36. The beam-like cross member 24 extends between the two distal ends of the two supporting struts 20. The filter material 31 of the filter element 30 is connected to the correspondingly outlined bottom part of the cross member 24 in the head region 36. In this manner, the cross member 24 serves as an additional reinforcement and holding element of the filter surface in the head region 36.

Figure 4:
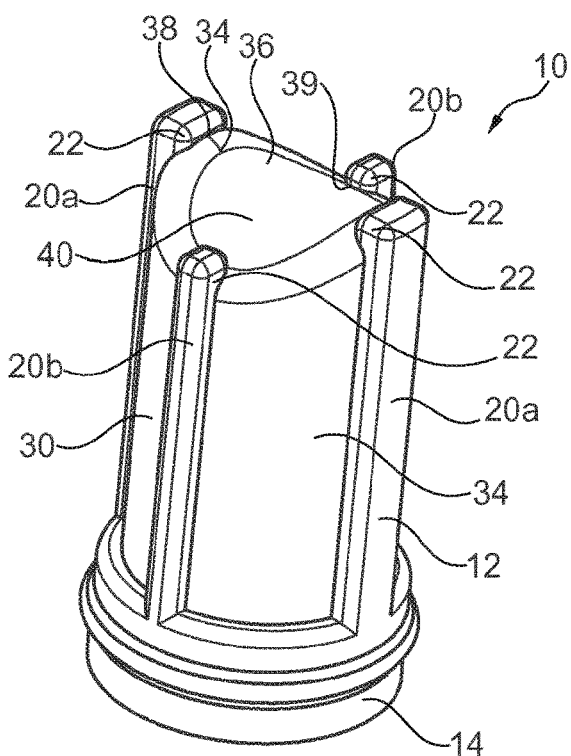
FIG. 4: a perspective view of a third filter according to the invention with four supporting struts.

The third embodiment of a filter 10 according to the invention as shown in FIG. 4 is based on the described first embodiment according to FIG. 1. In addition to the first embodiment with a first pair of supporting struts 20a the frame element 12 comprises a second pair of supporting struts 20b, whereby the two pairs are arranged displaced relative to each other at an angle of 90°.

As in the first embodiment according to FIG. 1, the supporting struts 20a of the first pair in the embodiment according to FIG. 4 extend linearly along the circumferential region 34 of the filter element 30 up to the tips 38 in the head region 36. The supporting strut 20b of the second pair extends away from the base 14 along the circumferential region 34 of the filter element 30 up to the low points 39 of the recess 40 at the saddle-shaped head region 36. In such a manner, the head region 36 is supported and held at the maximum and minimum points of the edge area 42 by the vertical supporting struts 20a, 20b with their respective covering caps 22 towering radially inwardly. In addition, at the edge 42 of the head region 36 a welded outer edge 34 is still indicated in FIG. 4, which extends further along the struts 20a in the circumferential region 34 of the sleeve-shaped filter region 30 up to the base 14.

Figure 5:
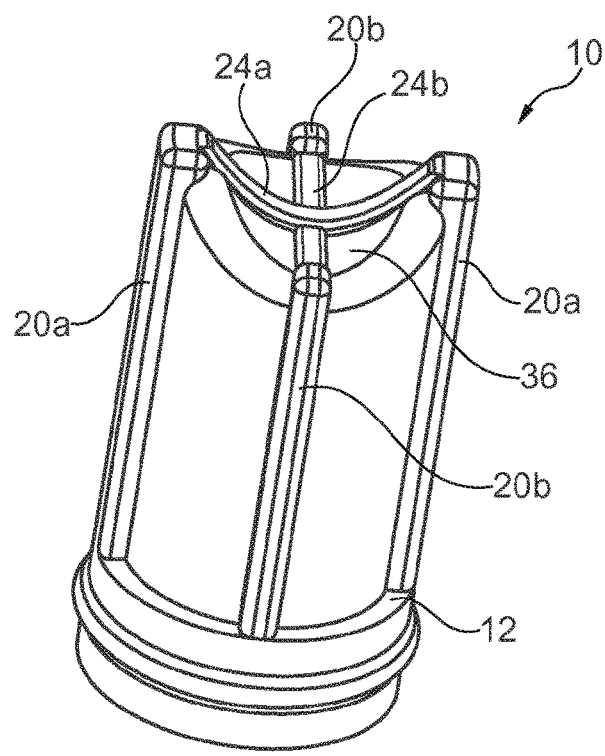
FIG. 5: a perspective view of a fourth filter according to the invention with two cross members.

A fourth embodiment of a filter 10 according to the invention is illustrated in FIG. 5. The fourth embodiment largely corresponds to the third embodiment according to FIG. 4, whereby the two pairs of supporting struts 20a, 20b comprise a cross member 24a, 24b each in the head region 36. The two cross members 24a, 24b cross at a right angle in the region of the longitudinal axis of the filter 10. The two cross members 24a, 24b are provided as relatively thin beams, which follow in their extension direction the saddle shape of the head region 36 and hug themselves on the respective contour.

Figure 6:
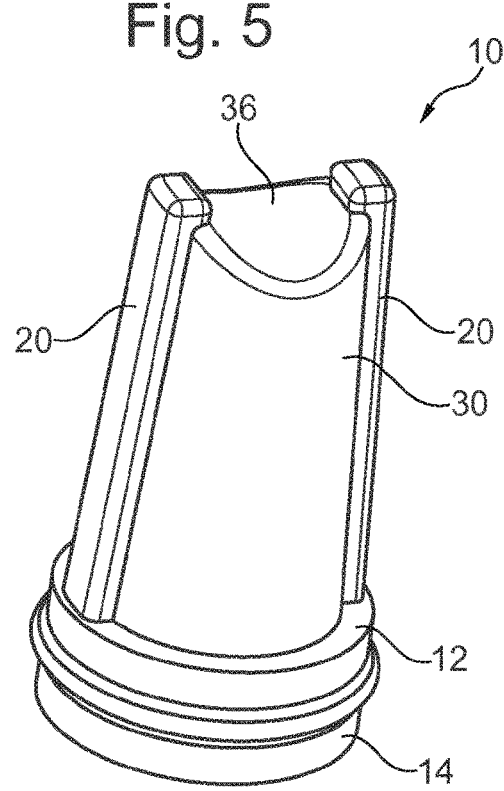
FIG. 6: a perspective view of a fifth filter according to the invention with a conical filter element.

A fifth embodiment of a filter 10 according to the invention shown in FIG. 6 comprises a frame element 12 with two supporting struts 20. This fifth embodiment resembles the embodiment according to FIG. 1, whereby the filter element 30 in the filter 10 according to the fifth embodiment is conically shaped. The filter element 30 is thereby tapered from the base 14 to the head region 36. Accordingly, the frame element 12 is provided with two cross members 20, which are inclined towards the middle and are thus adjusted to the conical outer contour of the circumferential region 34 of the filter element 30. The embodiments according to FIGS. 1 to 5 can also be designed conically, whereas the embodiment according to FIG. 6 can be cylindrical as well.

The invention claimed is:

1. Filter for filtering a liquid or a gas comprising
a pocket-shaped filter element which has a sleeve-shaped circumferential region, a closed head region and an open foot region, and
a frame element, which has an annular pipe socket-like base in which the foot region of the filter element is accommodated, and which comprises at least one supporting strut, which extends away from the base along the circumferential region of the filter element,
wherein
the head region extending away from the base of the filter element is saddle-shaped, whereby two lateral tips are provided between which a channel-shaped recess is formed.

2. Filter according to claim 1,
wherein
the pocket-shaped filter element is formed from one single planar filter material by folding and welding the outer edges.

3. Filter according to claim 2,
wherein
two welded outer edges are provided, which extend along a longitudinal axis of the filter element and extend from the foot region to the head region of the pocket-shaped filter element.

4. Filter according to claim 1,
wherein
the at least one supporting strut extends along at least one welded outer edge of the filter element from the base up to one of the tips in the head region, and the welded outer edge is covered by the supporting strut.

5. Filter according to claim 1,
wherein
at least two supporting struts are provided by pairs, which extend alongside opposite sides of the pocket-shaped filter element.

6. Filter according to claim 5,
wherein
the two supporting struts of one pair are connected with each other by at least one cross member in the head region.

7. Filter according to claim 5,
wherein
two pairs of supporting struts are arranged, which are displaced relative to one another at a 90° angle at the circumference of the base.

8. Filter according to claim 6,
wherein
the at least one cross member is adapted to the saddle shape of the head region.

9. Filter according to claim 1,
wherein
at least one supporting strut and/or at least one cross member is arranged at the inside and the outside of the pocket-shaped filter element and is connected to it.

10. Filter according to claim 1,
wherein
the frame element is made of a plastic material by way of moulding, in particular injection moulding, whereby the filter element is firmly attached with the frame element during the moulding process.

11. Filter according to claim 1,
wherein
the filter element comprises a fabric, a fleece, a knitting and/or a membrane.

12. Filter according to claim 1,
wherein
the circumferential region of the filter element is shaped cylindrically or conically.

* * * * *